Jan. 8, 1963 R. GOFFAUX 3,072,828
MOUNTING FOR LIGHTNING-ARRESTERS
Filed July 18, 1960 2 Sheets-Sheet 2
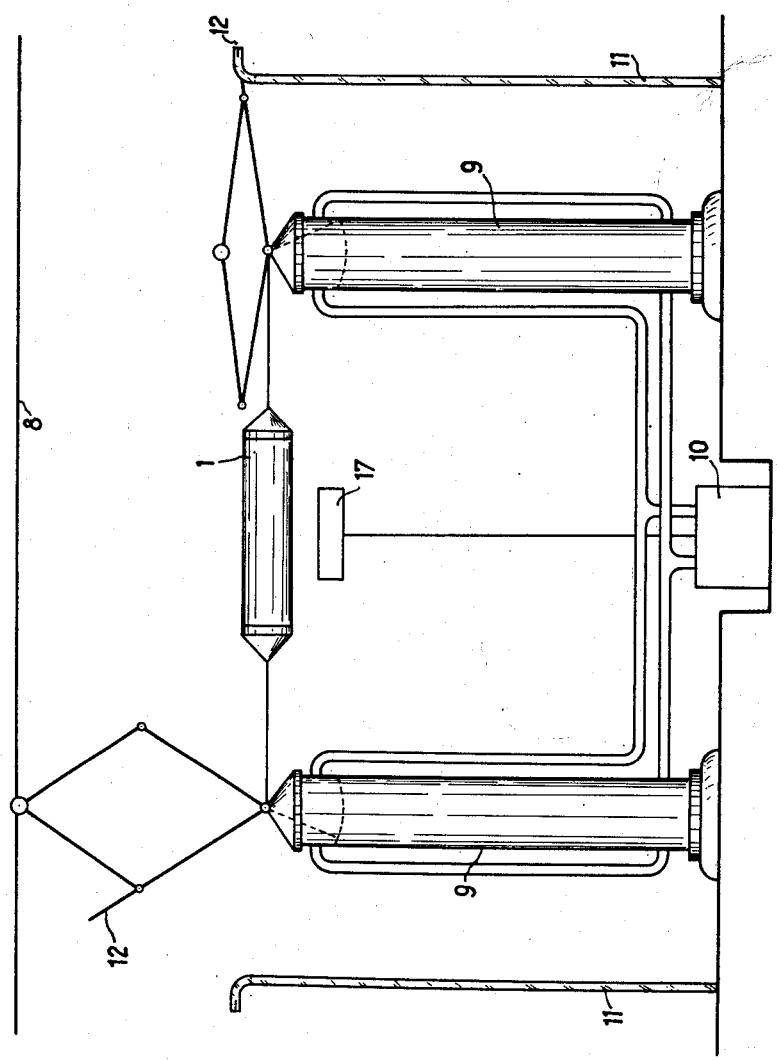
INVENTOR
Raoul GOFFAUX
BY
ATTORNEYS

United States Patent Office 3,072,828
Patented Jan. 8, 1963

3,072,828
MOUNTING FOR LIGHTNING-ARRESTERS
Raoul Goffaux, Mont-sur-Marchienne, Belgium, assignor to Ateliers de Constructions Electriques de Charleroi, Brussels, Belgium
Filed July 18, 1960, Ser. No. 43,348
Claims priority, application France Aug. 3, 1959
10 Claims. (Cl. 317—61)

This invention relates to lightning-arresters of the kind formed by a series of spark-gaps and interposed semi-conductors (such as packed grains of silicon carbide) the resistance of which varies with the voltage: it is known that semi-conductors have a relatively short life when they are subjected to transients of large amplitude. In view of the modern tendency to subdivision of power networks, the shock waves or transients in large networks become more and more intense.

I have found that the short life of these semiconductors in lightning arresters of the above kind is due to an ionic migration giving rise to a polarization effect in the semi-conductors.

The primary object of the present invention is to combat the effect of this ionic migration or polarization and thereby to prolong the useful life of the semi-conductors, by inversion of the discharge path in the lightning-arrester.

A specific object is to provide a mounting whereby this inversion of the discharge path is readily obtained.

A further object is to provide switching means for effecting the inversion of the discharge path by operation of a control device which will respond to the magnetic field created by a discharge.

The invention also comprises an improved mounting for such a lightning arrester, which provides for the inversion of the discharge path according to a pre-determined program.

Other objects and advantages of the invention will hereinafter appear from the following description of two non-limitative embodiments, given with reference to the accompanying diagrammatic drawings, in which:

FIG. 2 illustrates a modification in which the lightning-arrester is mounted between two pillars, each provided with a pantograph switch for alternative connection to the high tension line.

Figure 1:
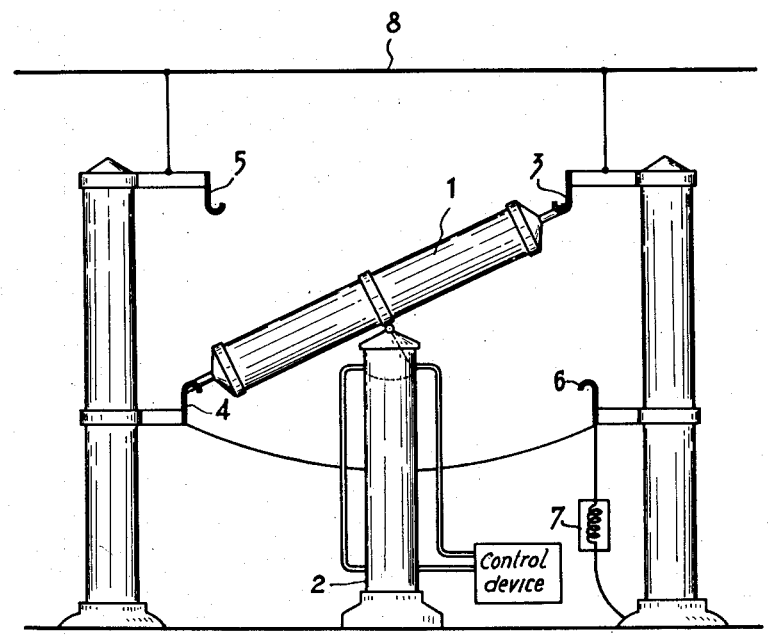
FIG. 1 illustrates a lightning-arrester of the kind described, mounted for rocking movement upon a pillar, and co-operating alternatively with two fixed connectors of the high tension line.

It is known that the intense shock waves due to atmospheric discharges are nearly always of the same sign, this being true in about 90 percent of instances.

Polarization of the variable resistances in lightning-arresters of the kind described above is produced by an ionic migration in the atoms of the semiconductors; this polarization increases more and more with the number of shocks and thus decreases the thickness of the interatomic electronic barriers which facilitates the destruction of the latter and thereby the destruction of the resistance of the semi-conductors.

According to the invention, the effect of this ionic migration is combatted by frequently changing or inverting the path of discharge in the lightning-arrester, so that the ionic migration is reversed at every change. In order to accomplish this, the input and output connections of the lightning-arrester are changed over, as by switching.

Referring to FIG. 1, the lightning-arrester 1, which is of a symmetrical construction, is mounted for example upon an insulating pillar 2, arranged between two other pillars supporting upper and lower connectors; the upper connectors 3 and 5 are branched from the high-tension line 8, and the lower connectors 4 and 6 are grounded, as through a common relay 7.

The lightning-arrester 1 is arranged to rock about a pivot at the top of the pillar 2, for example by the operation of a pneumatic motor incorporated therein and shown in dotted lines, with a suitable control device enabling the arrester 1 to be placed in either of two oppositely inclined positions. In one position of the arrester 1, as shown, the current passes from the high-tension line connector 3 to the grounded connector 4; in the reversed position of the arrester, the current would pass from the high-tension line connector 5 to the grounded connector 6.

The two connectors 4 and 6 are shown as being connected together and grounded through the common relay 7, which may be made sensitive to a given minimum current intensity. This relay may control the pneumatic motor which produces the rocking movement of the lightning-arrester 1, or it may control a memory device which will cause the rocking movement to be produced at a later time.

Specifically, the change-over of the connections may be effected daily, at a time when atmospheric discharges are most unlikely, or after every discharge registered by the relay 7, or again every day provided that at least one discharge has been registered during the preceding twenty-four hours.

Naturally, and without departing from the scope of the invention, any desired means may be utilized for changing over the connections of the lightning-arrester and the changes may be carried out by hand or according to any desired system or program and under any suitable conditions.

For example, according to the modification represented in FIG. 2 of the drawings, the reversal of the discharge path in the lightning arrester, obtained by the change-over of the input and output connections, is effected by means of two isolating switches, the operation of which is arranged in such a way that if either of the two switches is connected to the high tension line, the other is connected to ground. As shown in FIG. 2, the lightning-arrester 1, formed by a series of spark-gaps and interposed semi-conductive resistances consisting for example of silicon carbide grains, is mounted fixedly between two insulating pillars 9, the arrester being disposed horizontally. The spark-gaps and semi-conductive resistances are arranged symmetrically in relation to the discharge path; for example one half of the spark-gaps will be placed near the right-hand end of the arrester, and the other half near the left-hand end, while the semi-conductive resistances will be placed in the middle of the lightning arrester.

Each insulating pillar 9 carries an isolating switch of pantograph type, operated by a pneumatic motor incorporated in a chamber inside the pillar, as represented in dotted lines, to which compressed air can be supplied by pipe lines from a control device 10. Accordingly as the air pressure is supplied to one or other of these pipe lines, either the left-hand pantograph switch is connected to the high tension line 8, while the right-hand pantograph is lowered, as shown, or the right-hand pantograph will be connected to the high tension line 8, while the left-hand pantograph will be lowered. When either pantograph switch is lowered, an extension 12 of one of the pantograph arms effects the grounding of one end of the lightning-arrester through a connector 11.

If desired, a winding or other device 17 responsive to the magnetic field of the discharge current in the arrester 1 may be arranged at a suitable distance from the arrester. This device 17 operates to send a detection signal to the control device 10, so that the latter will change over the supply of compressed air from one pipe line to the other as soon as a discharge has taken place, in such a way that the raised pantograph will be lowered, and the lowered pantograph will be raised, thereby inverting the discharge path in the arrester. The control device 10 may be fitted with a memory device for delaying the execution of the order given by the detection signal, according to a pre-established program. This program may be such for example, that every day at a certain hour the control device actuates the change-over switches on condition that during the preceding twenty four hours one discharge has taken place, or else such that during a daily and manually operated inspection the change-over switches are actuated if there has been registered one discharge since the last inspection.

What I claim and desire to secure by Letters Patent is:

1. A lightning-arrester assembly comprising: resistances of a semi-conducting material connected in series with spark gaps and first and second terminals at opposite ends of said assembly; said spark gap and semiconducting material being disposed in one or more stacks connected in series; each stack having gaps at both ends and semiconducting material between the gaps in order that said arrester assembly will have the same breakdown voltage when subjected to shock waves applied from said first to said second terminal or from said second to said first terminal; a high-tension line and a ground connection; at least one support on which said arrester is mounted; and switching means for connecting said first terminal to the high-tension line when said second terminal is connected to said ground connection and inversally for connecting said second terminal to the high-tension line when said first terminal is connected to said ground connection.

2. A mounting for a lightning-arrester as claimed in claim 1, comprising further control means operably connected to said switching means for actuating said switching means on a predetermined program.

3. A mounting for a lightning-arrester as claimed in claim 1, comprising further control means operably connected to said switching means, and a signal device responsive to lightning discharge from the high-tension line through said lightning arrester to ground, said signal device adapted to deliver a signal to said control means for operation of said switching means.

4. A mounting for a lightning-arrester as claimed in claim 1, comprising further control means operably connected to said switching means, and a signal device responsive to lightning discharge from the high-tension line through said lightning-arrester to ground, said signal device adapted to deliver a signal to said control means for operation of said switching means on a program determinad by the signal delivered to said control means.

5. A mounting for a lightning-arrester as claimed in claim 1, comprising further control means operably connected to said switching means, and a signal device responsive to lightning discharge from the high-tension line through said lightning-arrester to ground, said signal device adapted to deliver a signal to said control means for operation of said switching means at a fixed time.

6. A lightning-arrester assembly comprising: resistances of a semi-conducting material connected in series with spark gaps and first and second terminals at opposite ends of said assembly; said spark gap and semiconducting material being disposed in one or more stacks connected in series; each stack having gaps at both ends and semiconducting material between the gaps in order that said arrester assembly will have the same breakdown voltage when subjected to shock waves applied from said first to said second terminal or from said second to said first terminals; a high tension line and a ground connection; at least one support on which said arrester is mounted; and pneumatic switching means for connecting said first terminal to the high-tension line when said second terminal is connected to said ground connection and inversally for connecting said second terminal to the high-tension line when said first terminal is connected to ground.

7. A lightning-arrester assembly comprising: resistances of a semi-conducting material connected in series with spark gaps and first and second terminals at opposite ends of said assembly; said spark gap and semiconducting material being disposed in one or more stacks connected in series; each stack having gaps at both ends and semiconducting material between the gaps in order that said arrester assembly will have the same breakdown voltage when subjected to shock waves applied from said first to said second terminal or from said second to said first terminals; a high-tension line and a ground connection; at least one support on which said arrester is mounted; pneumatic switching means for connecting said first terminal to the high-tension line when said second terminal is connected to said ground connection and inversally for connecting said second terminal to the high-tension line when said first terminal is connected to said ground connection; control means for actuating said pneumatic switching means on a predetermined program and piping means connecting said control means to said pneumatic switching means.

8. A lightning-arrester assembly comprising: resistances of a semi-conducting material connected in series with spark gaps and first and second terminals at opposite ends of said assembly; said spark gap and semiconducting material being disposed in one or more stacks connected in series; each stack having gaps at both ends and semiconducting material between the gaps in order that said arrester assembly will have the same breakdown voltage when subjected to shock waves applied from said first to said second terminal or from said second to said first terminal; a high-tension line and a ground connection; means for pivotally supporting said arrester centrally thereof; and means for producing pivotal movement of said lightning-arrester so as to connect said first terminal to the high-tension line when said second terminal is connected to said ground connection and inversally to connect said second terminal to the high-tension line when said first terminal is connected to said ground connection.

9. A mounting for a lightning-arrester as claimed in claim 8, comprising further control means operably connected to said means for producing pivotal movement of said lightning arrester, said control means causing the pivotal movement to follow a predetermine dprogram.

10. A lightning-arrester assembly comprising: resistances of a semi-conducting material connected in series with spark gaps and first and second terminals at opposite ends of said assembly; said spark gap and semiconducting material being disposed in one or more stacks connected in series; each stack having gaps at both ends and semiconducting material between the gaps in order that said arrester assembly will have the same breakdown voltage when subjected to shock waves applied from said first to said second terminal or from said second to said first terminal; a high-tension line and a ground connection; at least one support on which said arrester is mounted; two insulating switches including pantographs disposed at opposite ends of said lightning-arrester; each of said insulating switches adapted to establish contact with the high-tension line erected position of its pantograph and to establish contact with said ground connection in the lower position of its pantograph; and commutating means controlling simultaneously the erection of one pantograph and the lowering of the other pantograph whereby to provide a discharge path in either direction through said lightning-arrester from the high-tension line to said ground connection.

References Cited in the file of this patent

UNITED STATES PATENTS 2,723,367    Bockman _____ Nov. 8, 1955